United States Patent [19]

Barkhoudarian

[11] Patent Number: 4,612,797
[45] Date of Patent: Sep. 23, 1986

[54] LEAK LOCATING AND MAPPING SYSTEM AND METHOD

[75] Inventor: Sarkis Barkhoudarian, Canoga Park, Calif.

[73] Assignee: Rockwell International Corporation, El Segundo, Calif.

[21] Appl. No.: 625,473

[22] Filed: Jun. 27, 1984

[51] Int. Cl.$^4$ ................ G01M 3/04; G01M 3/38
[52] U.S. Cl. .................. 73/40.5 R; 356/347
[58] Field of Search ............. 73/40, 40.5 R; 356/347, 356/348

[56] References Cited

U.S. PATENT DOCUMENTS 3,802,758  4/1974  Havener et al. ............... 356/347
4,492,468  1/1985  Huignard et al. ............... 356/347

OTHER PUBLICATIONS

Giterman et al., "Determining Sensitivity in Inspecting for Tightness by the Holographic Interferometry Method", *Sov. J. Nondestr. Test.*, vol. 14, No. 4, Apr. 1978, pp. 378-382.
Nakatani et al., "Flow Visualization by an Improved Double Exposure Method in Holography", *Optics and Laser Technology*, Apr. 1974, pp. 82-83.
Shatilov et al., "Recording of Pulsed Gasdynamic Processes by Holographic Shearing Interferometry", *Fluid Mechanics*—Soviet Research, vol. 5, No. 1, Jan.-Feb. 1976, pp. 154-162.
Newport Corporation, 1983-84 *Catalog*, pp. 184-186.

*Primary Examiner*—Stewart J. Levy
*Assistant Examiner*—John E. Chapman, Jr.
*Attorney, Agent, or Firm*—H. Fredrick Hamann; Harry B. Field; Lawrence N. Ginsberg

[57] ABSTRACT

A leak locating, mapping and measuring system (10) comprising an image recording medium (32), a laser (18), optical components (22) which cooperate with the laser to produce and superimpose successive holographic images of the test subject (12) upon the recording medium, a video camera (34) trained upon the medium and a real-time monitor (35) and recorder (36) for processing the output of the camera to assist analysis. The device is operated to create a first, reference hologram of the test subject while it is in an unpressurized state. A second holographic image is then taken while the test subject is pressurized with fluid from tank (38), which image is superimposed over the reference image. The resultant lines of interference between the superimposed images are then analyzed for distortions (66), which distortions indicate the location and magnitude of leakage flows at or about the test subject. Each holographic image may be created with laser beams of a selected duration which diminishes the effects of vibration in the test subject.

8 Claims, 3 Drawing Figures

LEAK LOCATING AND MAPPING SYSTEM AND METHOD

BACKGROUND OF THE INVENTION

1. Field of the Invention

The present invention relates to devices and methods for detecting leaks in test subjects and more specifically, to leak detection systems utilizing holography for locating and measuring leaks in rocket motors.

2. Description of the Prior Art

Most rocket engines comprise a myriad of interconnected ducts, manifolds and chambers which convey highly combustible fluids under extreme temperatures and pressures. A leak in any fluid passage, or in any connection therebetween is often hazardous and sometimes catastrophic. Great attention has therefore been directed towards finding ways to check rocket engines for leaks, particularly methods which can be conducted expediently and economically during the manufacture and check-out of the engines.

The most commonly used test for detecting leaks in rocket engines is the soap-bubble test, whereby films of soap solution are applied about preselected locations on a subject engine. As the engine is charged with purging fluid, any gas leaking from the engine forms tell-tale soap bubbles. However, it has been found that this method is very disadvantageous because it can be applied only to a few accessible portions of the rocket motor and is so time-consuming that even if it could be more universally applied, its application to all of the hundreds of joints, welds and brazes on an engine would be prohibitive. In addition, the method requires the application of a soap film upon test subject, which application disturbs surface finish.

Another device for leak testing rocket engines comprises a bag for encapsulating the powerhead of the engine and means for directing an effluent to pass through the bag and then into a spectrometer while the engine is being purged. Any leakage from the engine is carried by the effluent to the spectrometer where it is detected. This device is disadvantaged, however, by its limited ability to detect only the presence of a leak without any indication as to its location. Moreover, the device requires the attachment of the bag to the engine, which is a cumbersome and time consuming step. In addition, the seal between the bag and the engine itself can be a source of leakage which can affect the results obtained from the spectrometer.

Other prior devices used for detecting leaks in rocket engines include helium spectrometric leak detectors, ultrasonic leak detectors and thermo-differential leak detectors. However, the spectrometric and thermo-differential devices suffer the disadvantage that they have little or no capability for detecting leaks unless they are placed in close proximity to the suspected situs of each leak. Similarly, the usefulness of the ultrasonic devices is hampered by their requirement that they be properly aimed towards each leak, individually. Because all of these devices must be applied to all of the suspected situses, one at a time, their use in connection with complicated subjects, such as rocket engines, exacts unacceptably large amounts of time and effort. Consequently, great interest has remained in the discovery of a device which is capable of indicating in an expedient fashion both the location and magnitude of all leaks in a given test subject, even when the test subject is quite complicated.

OBJECTS OF THE PRESENT INVENTION

Accordingly, it is an object of the present invention to provide a leak locator system which is capable of detecting the location and magnitude of any and all leakage flows emanating from a test subject.

Another object of the present invention is to provide a leak locator system for rocket engines and other test subjects which is both expedient and effective over the substantial entirety of a test subject.

It is yet another object of the present invention to provide a leak locator system which can survey at one time the entire rocket engine, or a substantial part thereof, instead of just a few preselected locations on the engine.

It is yet another object of the present invention to provide a method of locating and measuring leaks which neither requires the attachment of devices to the test subject nor requires the application of film or foreign fluid to any surface of the subject.

It is another object of the present invention to provide a method for locating and measuring leaks which can be executed remotely from the test subject, thus allowing the placement of the leak locator in a protected or otherwise benign environment.

It is still another object of the present invention to provide a method and device capable of mapping the spatial extend of leakage flows from a test subject.

It is still another object of the present invention to provide a means for locating the smaller leaks in rocket engines, particularly those which are not ordinarily detectable with the soap bubble test or the bag test.

SUMMARY OF THE INVENTION

These and other objects are achieved by a leak locator constructed according to the present invention which comprises a recording medium, a laser, optical components which cooperate with the laser to create and superimpose successive holographic images of a test subject upon the recording medium, means for selectively pressurizing the test subject and a means for analyzing the interference between the superimposed images. In use with rocket engines, the device is operated to create a first, reference hologram of the test engine before the engine is pressurized with purging fluid. A second holographic image is then taken during the purging of the engine which image is superimposed over the reference image. By means of a real-time television monitoring screen, resultant lines of interference in the superimposed images are analyzed for distortions, which correspond with the location and magnitude of leakage flows at or about the engine. Each holographic image may be created with pulsed laser beams of sufficient duration to diminish the effects of vibration in the test engine during the purging and/or test firing of the engine. Once a leak is detected, additional holographic images may be taken and superimposed over the reference image in order to measure the time-domain characteristics of the leak. A video camera and recorder is also provided to preserve a record of the test results.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawing are designated by the same reference characters, while equivalent elements bear a prime designation.

DETAILED DESCRIPTION OF THE PREFERRED EMBODIMENT

Figure 1:
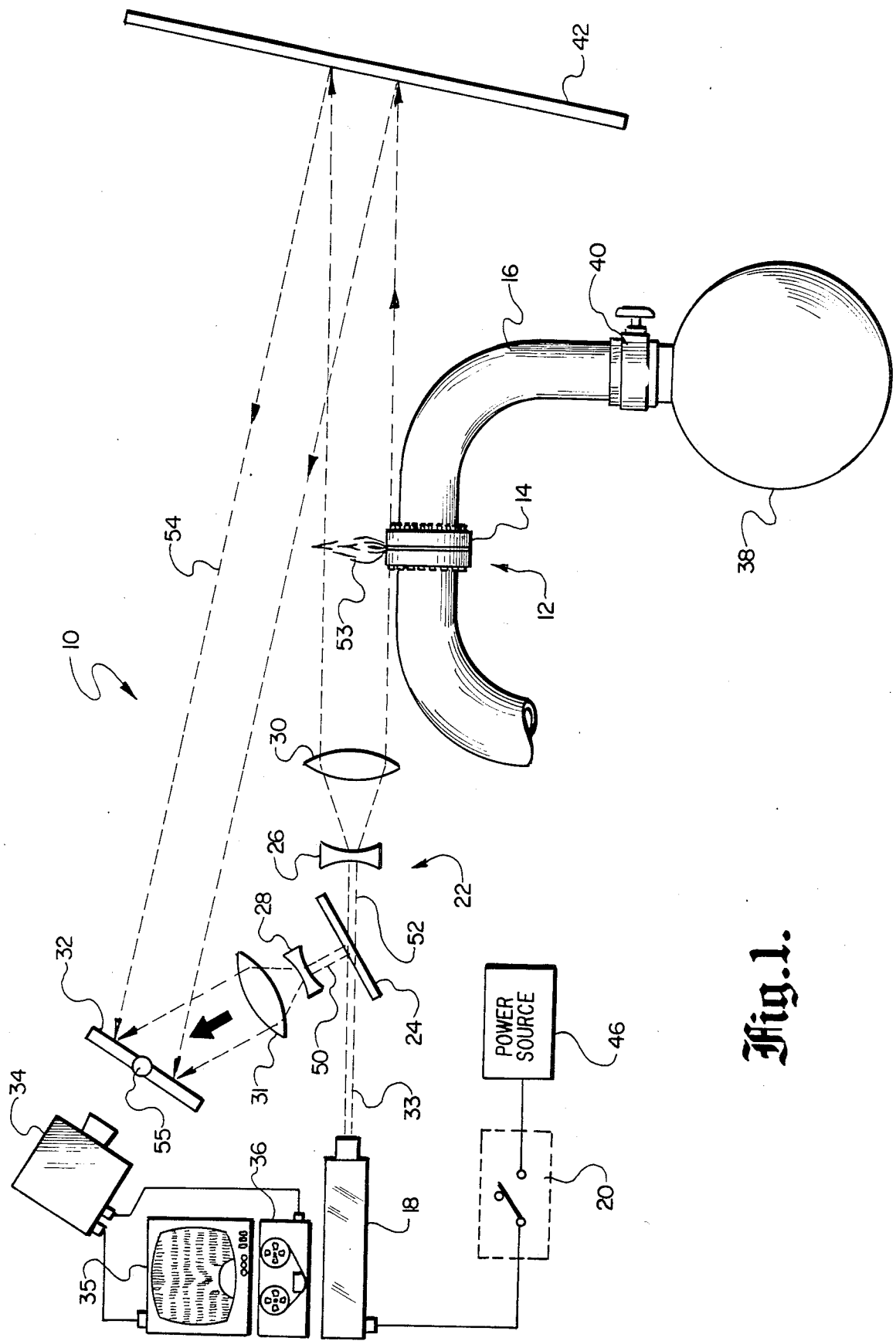
FIG. 1 is a schematic view of a leak detection system constructed according to the preferred embodiment of the claimed invention.

Referring to FIG. 1, the present invention provides a leak locator system 10 and method for leak testing a test subject 12 such as a joint 14 along duct 16 of a rocket engine. Leak locator system 10, when constructed according to the preferred embodiment, comprises a laser 18, a switch 20 for controlling the operation of laser 18, optical components 22 comprising partial mirror 24, expanding lens 26 and 28 and collimating lens 30 and 31 for forming holographic images of test subject 12 on recording medium 32 from each successive laser pulse 33 emitted from laser 18. Recording medium 32 preferably comprises a transparent photographic plate which is capable of photographically recording a first, reference holographic image of test subject 12 which is to be produced while test subject 12 remains unpressurized. A video camera 34 and a real-time television monitor 35 are provided to monitor the patterns produced on recording medium 32, and recorder 36 is provided to record the patterns formed on recording medium 32 for purposes of preserving the resultant information for further analysis. Leak detection system 10 also preferably includes means for selectively pressurizing test subject 12 such as a tank 38 of pressurizing fluid which is controlled by operation of valve 40 on duct 16. Also provided is a mirror 42 which is situated at the far side of test subject 12 from laser 18 and which serves as a reflective background of test subject 12 for purposes of directing light towards recording medium 32. Switch 20 controls power delivered from power source 46 to laser 18 to thereby serve as a trigger for laser 18.

In operation, a first laser pulse from laser 18 creates a first reference holographic image of test subject 12 which is photographically recorded on recording medium 32. Thereupon recording medium 32 is removed from leak locator system 10, photographically processed to develop the first reference image and then returned to its same place within leak locator system 10. Then, while test subject 12 is being charged with pressurizing fluid from tank 38, a second laser pulse from laser 18 creates a second holographic image of test subject 12 on recording medium 32 which has the effect of superimposing the second image over the first reference image. The resultant superimposition creates an interference pattern upon recording medium 32, which interference pattern shows distortions wherever leakage flows have affected the optical path length of the second laser pulse.

Laser 18 and optical components 22 cooperate to produce holographic images of test subject 12 on image recording medium 32. Each pulse 33 from laser 18 strikes partial mirror 24 and splits into a reference beam 50 and a scanning beam 52. Scanning beam 52 then passes through expanding lens 26 and collimating lens 30 before passing by all or a portion of test subject 12. That portion of scanning beam 52 which propagates through vicinity of leak 53 is reflected towards recording medium 32 by background mirror 42. Reference beam 50 is expanded by lens 28 and collimated by lens 31 before it strikes recording medium 32 in coincidental fashion with reflected beam 54. As a result, reflected beam 54 interferes with reference beam 50 to form a holographic image on medium 32. It is the holographic image produced in this fashion for the first laser pulse which is photographically retained by recording medium 32 for development. The second holographic image is produced in the same way and superimposed over the first reference holographic image.

Laser 18 is preferably a diode crystal type of about 10 to 100 milliwatts of power, laser diodes being advantageously small, durable and less fragile than many of the other types of lasers. When laser diodes are used, image recording medium 32 preferably comprises transparent infrared film, although any other recording medium which is sensitive to the infrared radiation would also be suitable. Other embodiments of the present invention might utililze other types of lasers to equal advantage, such as a HeNe gas laser, and both pulsed and continuous lasers can be used with equal success.

In the preferred embodiment, laser 18 preferably provides laser pulses having durations sufficiently short to allow sharp holographic imaging upon recording medium 32, yet sufficiently long to allow the effects of vibration in test subject 12 to be integrated over the time span of the pulse. For instance, if it is discovered that test subject 12 will vibrate as a result of its pressurization at a frequency of 1 kilohertz, which translates into a cycle period of one (1) millisecond, then a laser pulse of approximately 10 millisecond can be used to integrate the effects of such vibration in the holographic images produced on image recording medium 32. In this manner, the amount of vibrationally-induced interference, which might otherwise appear on the superimposed image constructed from the first and second pulses, is diminished. Thusly, leak detection system 10 can be used on test subjects which are subject to some degree of vibration during their pressurization. In the circumstance that use of a continuous laser is desired, switch 20 can be operated to control the duration of the beam produced by laser 18 for the purpose of avoiding the effects of vibration.

The relative positioning of laser 18, optical elements 22, test subject 12, image recording medium 32 and mirror 42 must remain substantially the same at the times when the first and second holographic images are produced. However, in the preferred embodiment, wherein image recording medium 32 comprises a transparent photographic plate, the practice of the invention requires the removal of the photographic plate from leak locator system 10 for purposes of developing the first reference image. The plate is then returned to its original position in leak locator system 10. This step of removing and returning the photographic plate (image recording medium 32) effects another result useful to the practice of the invention in that it causes the photographic plate to be displaced to at least a minute degree from its original position from whence the first reference holographic image was produced. This slight displacement of the plate causes the second holographic image to produce patterns of interference in the background field when the second holographic image is superimposed over the first.

Figure 2:
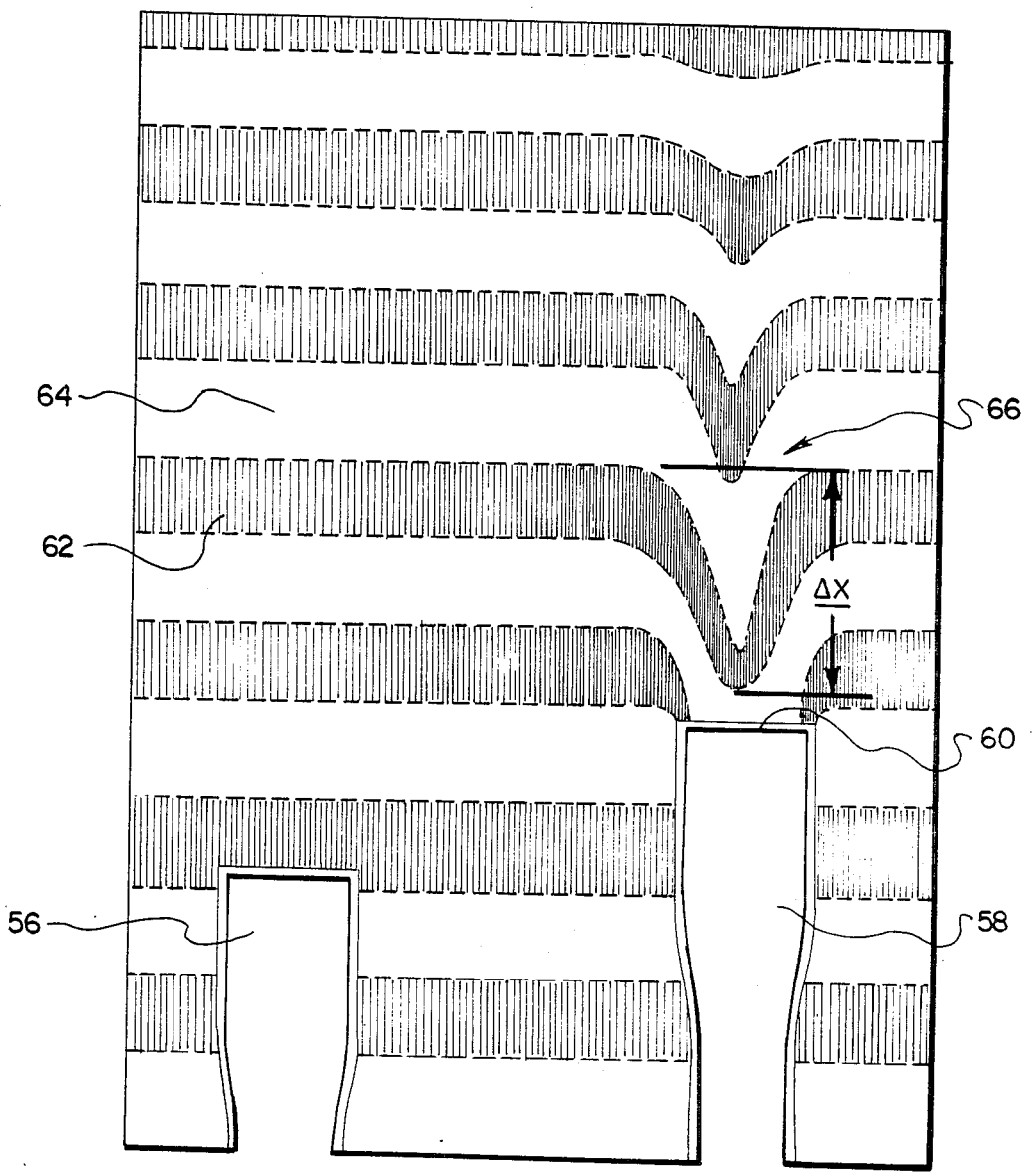
FIG. 2 is an image of a first and second flute obtained with a device constructed and operated in accordance with the present invention.

FIG. 2 shows a representative example of an image achieved using a leak detector constructed in accordance with the present invention. Shown therein is an outline of a closed flute 56 wherefrom no simulated leakage flow emanates and an outline of a second flute 58 which is opened slightly at locale 60 for allowing such a flow to escape. Generally, the dark bands 62 and the illuminated bands 64 over the background field of FIG. 2 portray the characteristics of the interference to be expected on recording medium 32 after the second holographic image is superimposed upon the first. At designation 66, there appears a disturbance in the otherwise uniform pattern created by bands 62 and 64, which disturbance correlates with the projected spatial domain of the leakage flow emanating from flute 58. It is believed that this disturbance in the pattern is due to the leakage flows effect on the optical path length of light. It is also to be noted that the undisturbed spacing between bands 62 and between bands 64 is uniform across the background field of the superimposed images. The amount of deflection of bands 62 or 64, as designated in FIG. 2 by $\Delta X$, can be used to measure the magnitude of the leakage flow in the following manner.

Figure 3:
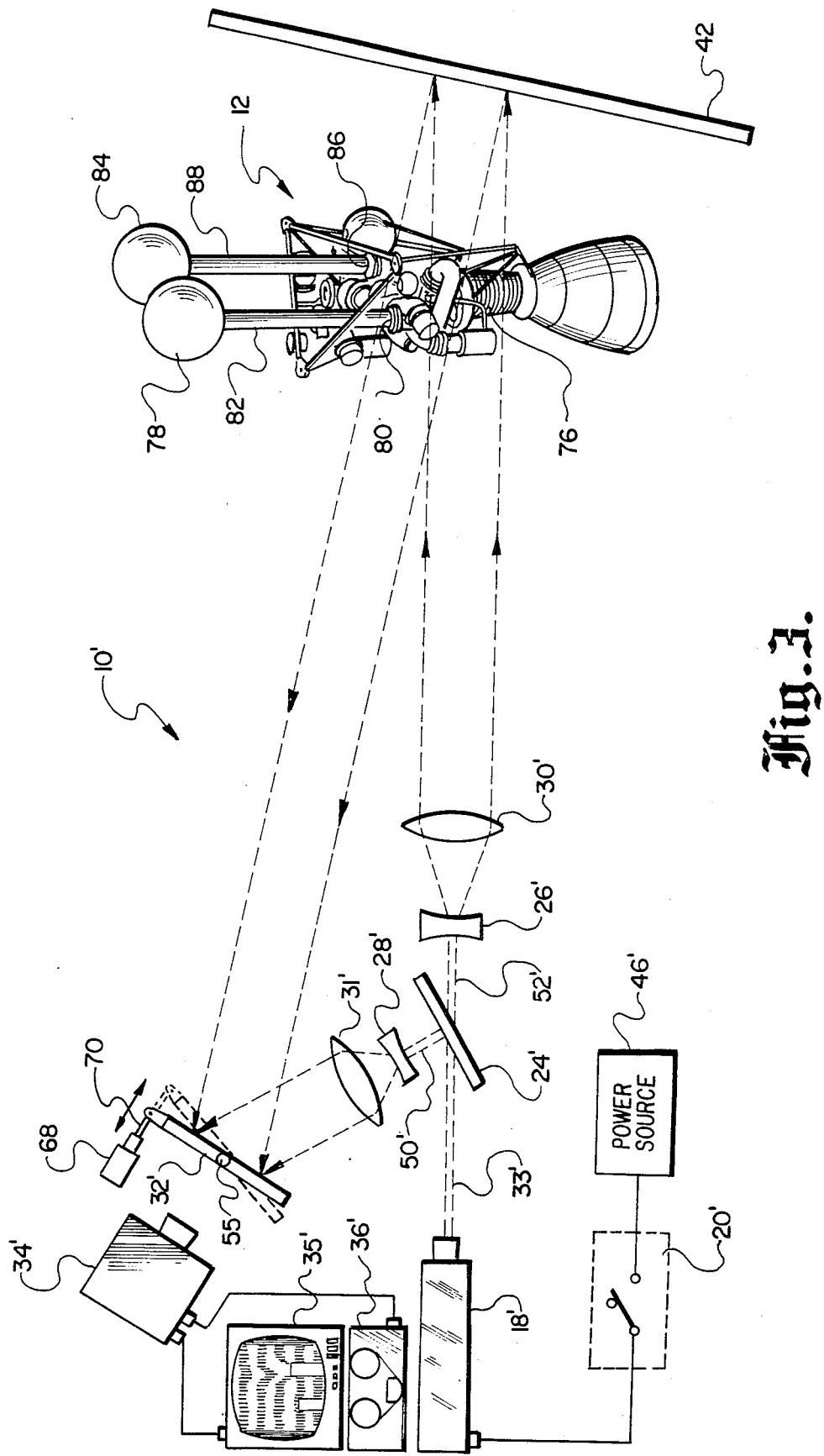
FIG. 3 is a schematic view of a leak detection system constructed according to another embodiment of the present invention.

It is to be noted that the undisturbed spacing of bands 62 and 64 can be adjusted by providing means for angularly displacing recording medium 32 slightly by prescribed amounts between the times when the first and second holographic images are produced. The embodiment shown in FIG. 3 achieves the prescribed displacement by means of an electro-mechanical servo 68 which acts upon recording medium 32' through linkage 70 to cause recording medium to rotate about axis 55 of a mounting fixture (not shown) by a pre-selected amount. In operation, the first reference holographic image is produced upon image recording medium 32' while the medium is fixed in position as indicated by the solid-lined representation of medium 32' in FIG. 3. Once the first holographic image has been recorded, servo 68 is then actuated to move medium 32' from its original position to a position which is angularly displaced about axis 55 from the first position by a small amount, usually in the range of one-half ($\frac{1}{2}$) of a degree. This second position is represented by the dotted-lined figment of image recording medium 32' in FIG. 3. At that point, medium 32' is in position for receiving the second holographic image of test subject 12'. Preferably, the amount of action of servo 68, whose direction is indicated by the double headed arrow in FIG. 3, is adjustable so that various degrees of spacing between bands 62 or 64 can be achieved as desired. Such capability allows for a wide range of calibration and adjustment of the sensitivity of leak locator system 10. It is to be noted that the displacement of medium 32' as described could be achieved by any of a wide-range of other devices which are known in the art, including manual means.

As the amount of action of servo 68 (and thus the amount angular displacement of medium 32') is increased, the amount of spacing between bands 62 and between bands 64 increases. Thusly, calibration of leak locator system 10 can be achieved by determination experimentally what amount of deflection ($\Delta x$) a known flow rate causes (e.g. a leakage flow of one standard cubic inch per minute (one SCIM) being found to cause five millimeters of deflection ($\Delta x$) in bands 62) and then adjusting the action of servo 68 such that the amount of angular displacement effected in image recording medium 32' causes bands 62 to appear in the background with an undisturbed spacing of five millimeters when the second holographic image is superimposed over the first. Once so calibrated, leak locator system 10 can then be used to measure the magnitude of any located leak having an initially unknown flow rate. For instance, if a leak is discovered under the present example which caused a deflection in bands 62 equal to one-third ($\frac{1}{3}$) of a spacing between bands 62, and the spacing between bands 62 have been adjusted to equal five millimeters, then it is known that the located leak measures 0.333 SCIM, or likewise, if the deflection equals three such spacings, then the located leak would be known to measure 3 SCIM. The same technique can be used with resort to the spacing between bands 64. In embodiments of the present invention such as the one shown in FIG. 1, manual tapping of an edge of image recording medium 32 or other such means is employed to cause medium 32 to be displaced about axis 55 until the desired, precalibrated amount of spacing between lines 62 (or between lines 64) is achieved.

The embodiment shown in FIG. 3 differs from the embodiment shown in FIG. 1 in that image recording medium 32' of FIG. 3 comprises a photo-electric recording plate supplied by the Newport Research Corporation, Fountain Valley, California. This type of recording medium is capable of temporarily recording the first reference laser image electrically, and therefore, it does not need to be removed from leak locator system 10 for processing as does the photographic plate. In use, the photo-electric recording plate retains the first reference laser image for a sufficiently long time-span to allow the second holographic image to be produced and superimposed over the reference image. As previously described, means such as servo 68 is provided for angularly displacing image recording medium 32' between the times at which the first and second holographic images are produced for purposes of creating interference patterns. As with the other embodiment, the interference patterns created in the superimposed images will suffer distortions wherever leakage flows appear and the degree of distortion can be correlated with calibrated valves to determine the magnitude of any leak. Both embodiments also achieve a map of the spacial extent of each leakage flow to provide additional information concerning the extent and nature of each leak.

Referring again to FIG. 3, it is to be noted that test subject 12 is a rocket engine 76, wherein purging fluid from tank 78 is directed to the propellant inlet 80 of engine 76 via valved duct 82 and purging fluid from tank 84 is directed to the oxidizer inlet 86 of engine 76 via valved duct 88 for purposes of pressurizing both the propellant and the oxidizer systems of the engine. In most instances, engine 76 is too large to be scanned all at once by scanning beam 52' and must be inspected piecemeal in accordance with the method herein disclosed.

It is also to be realized that the present invention could be practiced without resort to interference between a reference hologram and a second hologram. In this alternative, only a single holographic image is produced of test subject 12 while it is being pressurized, whereupon the hologram-produced on image recording medium 12 would show haziness in areas corresponding to the locations of leaks. In such practice, image recording medium 32 could comprise a simple projector viewing screen instead of a photographic or photo-electric plate. However, this manner of practice is not preferred because it does not provide the capacity to measure the magnitude of the leaks, it only indicates their location and spatial envelope.

Obviously, many modifications and variations of the present invention are possible in light of the above teachings. In particular, other means for producing holograms upon recording medium 32 might be employed or other forms of recording medium might be utilized. It is also to be noted that the described system and method has a broad range of applications, such as being a leak locator for use during the hot-test firing of a rocket engine, or even during its actual flight. In such circumstances the actual engine operation serves to pressurize the subject engine for purposes of practicing the invention. It is therefore to be understood that, within the scope of the appended claims, the invention may be practiced otherwise than as specifically described.

What is claimed and desired to be secured by Letters Patent of the United States is:

1. A method of locating and measuring leaks from a test subject, said method comprising the steps of:
   producing a reference holographic image of said test subject and any fluid surrounding the test subject, said holographic image being produced upon an image recording medium;
   pressurizing said test subject;
   producing a second holographic image of said test subject and any fluid surrounding said test subject, said second holographic image being produced during said pressurizing step upon said image recording screen, said second holographic image being superimposed over said reference holographic image to produce a hologram with an interference pattern; and
   analyzing distortions in said interference pattern for purposes of locating and measuring leaks.

2. The method as claimed in claim 1 wherein said reference and second holographic images are generated with laser beams having a duration which diminishes the effects of vibration in said test subject.

3. The method as claimed in claim 1 wherein said method further comprises the step of calibrating said image recording medium prior to producing any holographic images of the test subject or of and fluid surrounding the test subject by displacing said image recording medium such that said interference pattern exhibits a desired, scaled fringe spacing.

4. The method as claimed in claim 1 wherein said distortions are analyzed by means of a video camera trained upon a photo-electric image recording plate.

5. The method as claimed in claim 4 further comprising the step of displacing said photo-electric image recording plate an amount such that said intereference pattern exhibits a desired, scaled fringe spacing.

6. The method as claimed in claim 1 wherein said distortions are analyzed by means of a real-time monitor trained upon a photo-electric image recording plate.

7. The method as claimed in claim 1 wherein said holographic images are produced by a pulsed laser, said pulsed laser providing a beam whose duration diminishes the effects of vibration in said test subject upon said second holographic image.

8. The method as claimed in claim 1 wherein said holographic images are produced by a continuous beam laser, a triggering means controlling the duration of said continous beam laser such that the effects of vibration in said test subject upon said second holographic image is diminished.

* * * * *